United States Patent
Morisawa et al.

(10) Patent No.: US 7,222,249 B2
(45) Date of Patent: May 22, 2007

(54) ELECTRONIC APPARATUS AND METHOD OF SETTING SYSTEM ENVIRONMENT OF THE ELECTRONIC APPARATUS

(75) Inventors: Toshikazu Morisawa, Tokorozawa (JP); Satoru Arai, Kawasaki (JP); Koji Nakamura, Akiruno (JP); Hideaki Andoh, Ome (JP); Kei Sakamoto, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 481 days.

(21) Appl. No.: 10/715,526

(22) Filed: Nov. 19, 2003

(65) Prior Publication Data

US 2004/0107339 A1    Jun. 3, 2004

(30) Foreign Application Priority Data

Nov. 29, 2002   (JP)   ............... 2002-347497

(51) Int. Cl.
G06F 1/32 (2006.01)
G06F 1/00 (2006.01)
G06F 11/30 (2006.01)

(52) U.S. Cl. ............ 713/320; 713/300; 713/310; 713/340

(58) Field of Classification Search ......... 713/300, 713/320, 310, 340
See application file for complete search history.

(56) References Cited

U.S. PATENT DOCUMENTS

| 5,644,173 A | 7/1997 | Elliason et al. |
| 2002/0140400 A1 | 10/2002 | Hatori et al. |
| 2003/0009705 A1* | 1/2003 | Thelander et al. .......... 713/340 |

FOREIGN PATENT DOCUMENTS

| JP | 9-237137 | 9/1997 |
| JP | 11-65721 | 3/1999 |
| JP | 11-143593 | 5/1999 |
| JP | 2000-29576 | 1/2000 |
| JP | 2000-215002 | 8/2000 |
| JP | 2000-29576 | 1/2001 |
| JP | 2001-199134 | 7/2001 |
| WO | WO-02/061917 A1 | 8/2002 |

OTHER PUBLICATIONS

Notification of Reasons for Rejection issued by Japanese Patent Office mailed on Feb. 21, 2006, in Japanese patent application No. 2002-347497.
Search Report dated issued 21, 2006, from European Patent Office in European Patent Application No. EP03024587.
Notification of Reasons for Rejection issued by Japanese Patent Office issued on Jan. 31, 2005 in Japanese patent application No. 2002-347497.

* cited by examiner

Primary Examiner—Rehana Perveen
Assistant Examiner—Stefan Stoynov
(74) Attorney, Agent, or Firm—Finnegan, Henderson, Farabow, Garrett & Dunner, L.L.P.

(57) ABSTRACT

A peak shift/cut control program is a program for carrying out a system environment setting changeover control, and properly changes a profile in accordance with each time zone of profile B collectively managing system environment setting items. A user interface section sets time zone corresponding to each profile. A time acquire section periodically acquires system time from an internal clock section of an operating system, and transfers the system time to a profile changeover section. The profile changeover section carries out profile changeover control in accordance with time zone set by the user interface section while receiving the system time from the time acquire section.

10 Claims, 7 Drawing Sheets

Time zone setup

Normal profile: [ ▼ ] ~c1

Time zone ~c2
Start [ ▲▼ ] End [ ▲▼ ]      Profile ~c3 [ ▼ ]

Time zone
Start [ ▲▼ ] End [ ▲▼ ]      Profile [ ▼ ]

Time zone
Start [ ▲▼ ] End [ ▲▼ ]      Profile [ ▼ ]

Time zone
Start [ ▲▼ ] End [ ▲▼ ]      Profile [ ▼ ]

[ OK ]  [ Cancel ]

ELECTRONIC APPARATUS AND METHOD OF SETTING SYSTEM ENVIRONMENT OF THE ELECTRONIC APPARATUS

CROSS-REFERENCE TO RELATED APPLICATIONS

This application is based upon and claims the benefit of priority from the prior Japanese Patent Application No. 2002-347497, filed Nov. 29, 2002, the entire contents of which are incorporated herein by reference.

BACKGROUND OF THE INVENTION

1. Field of the Invention

The present invention relates to a technique of power saving control applied to electronic apparatuses such as personal computers.

2. Description of the Related Art

In recent years, various electronic apparatuses powered by both battery and an external source (AC commercial utility source) have been developed and come into widespread use. For example, portable (mobile) information terminals called PDAs (Personal Digital Assistants), notebook-sized personal computers or digital cameras are given as typical electronic apparatuses.

Recently, protection of the environment has attracted great interest; for example, the following study has been made to prevent global warming. Power consumption concentrating on the daytime is reduced (peak cut) and shifted (peak shift), and thereby, the environmental load of power generation facilities is made small.

In view of such circumstances, a mechanism to realize peak cut or peak shift is proposed in this kind of electronic apparatus (e.g., JPN. PAT. APPLN. KOKAI. Publication No. 2000-29576).

In general, this kind of electronic apparatus has the following large number of items for setting the system environment. For example, one is an item for turning off a monitor when a predetermined time elapses after the operation stops. Another is an item for turning off a hard disk when a predetermined time elapses after data access stops. A file called a profile collectively manages the items described above. Therefore, the profile is automatically changed in accordance with the time zone, and thereby, the above-mentioned peak cut and peak shift can be realized without increasing the cost.

However, correct automatic change of the profile in accordance with the time zone is not carried out in the conventional case. For this reason, a special mechanism for peak cut and peak shift is in fact independently and additionally provided.

BRIEF SUMMARY OF THE INVENTION

According to an embodiment of the present invention, an electronic apparatus comprises a storage unit storing profiles for managing system operating environment items; a setting unit configured to set a time zone capable of executing the system operation in accordance with the profiles; and a control unit configured to carry out system operation based on the profile corresponding to the time zone set by the setting unit.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

An embodiment of the present will be described below with reference to the accompanying drawings.

Figures 1, 4:
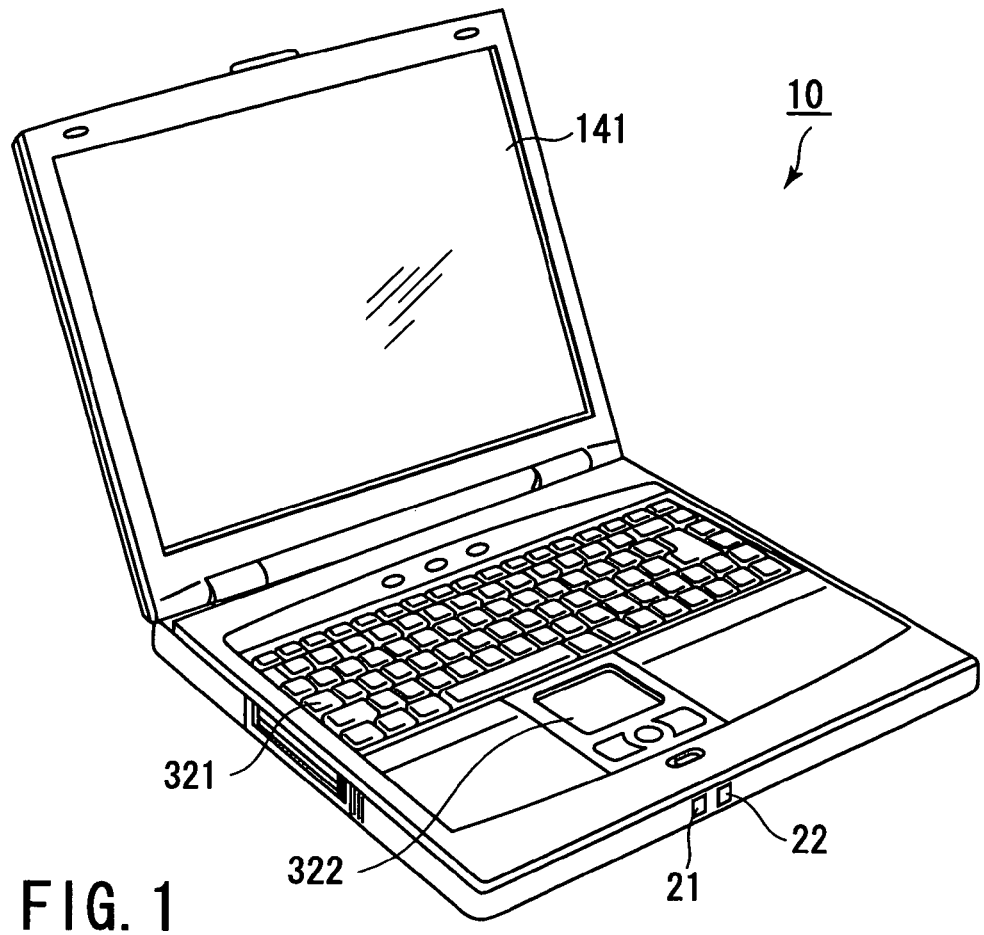
FIG. 1 is a view showing the appearance of an electronic apparatus according to an embodiment of the present invention.
FIG. 4 is a view to explain electronic apparatus operating state and environment assumed in the embodiment.

FIG. 1 is a view showing the appearance of an electronic apparatus according to an embodiment of the present invention.

An electronic apparatus 10 of the embodiment is a battery-powered notebook-sized personal computer. As shown in FIG. 1, the computer main body is provided with a cover, which has an LCD (Liquid Crystal Display) 141 for screen display at its inner surface. The cover is attached to the computer main body to freely open and close via a hinge mechanism. The computer main body is provided with a keyboard 321 for character input and a touch pad 322 for position input at its upper surface. In addition, the computer main body is provided with a battery LED 21 and an AC adapter LED 22. The battery LED 21 indicates the charging state of a battery (not shown), and the AC adapter LED 22 indicates the power supply state of an AC adapter (not shown).

Figure 2:
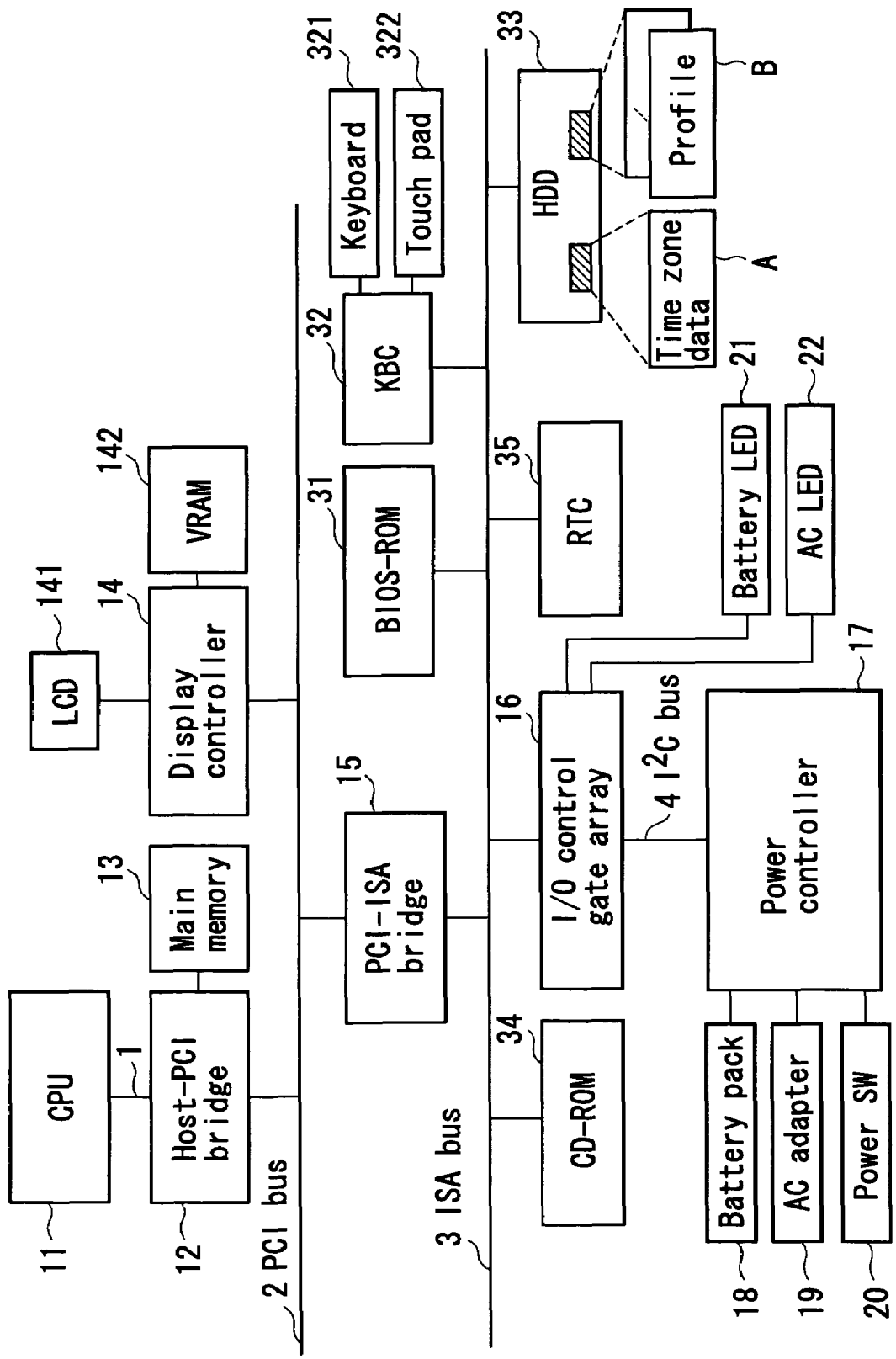
FIG. 2 is a block diagram showing the system configuration of the electronic apparatus of the embodiment.

FIG. 2 is a block diagram showing the system configuration of the electronic apparatus 10.

As seen from FIG. 2, the electronic apparatus 10 is provided with a processor bus 1, PCI bus 2, ISA bus 3, I2C bus 4, CPU 11, host-PCI bridge 12, main memory 13, display controller 14. Further, the electronic apparatus 10 is provided with a PCI-ISA bridge 15, I/O control gate array 16, power controller 17, BIOS-ROM 31, keyboard controller (KBC) 32, HDD 33, CD-ROM 34 and real-time clock (RTC) 35.

The CPU 11 executes programs stored in the main memory 13 to control the entirety of the system. The main memory 13 stores an operating system, a device driver and an application programs executed by the CPU 11 and processing data.

The host-PCI bridge 12 is a bridge LSI interposed between the processor bus 1 and the PCI bus 2.. The host-PCI bridge 12 has the following functions. One is a function of making bi-directional conversion of bus cycle including data and address. Another is a function of controlling the access of the main. memory 13 via memory bus.

The display controller 14 displays image data stored in a video memory (VRAM) 142 on the LCD 141.

The PCI-ISA bridge 15 is a bridge LSI interposed between the PCI bus 2 and the ISA bus 3. The ISA bus 3 is connected with BIOS-ROM 31 storing system BIOS, KBC 32 controlling keyboard 321 and touch pad 322, HDD 33, CD-ROM 34, RTC 35, I/O control gate array 16, etc. The RTC 35 is a clock module having self-operating battery.

The I/O control gate array 16 is a bridge LSI interposed between the ISA bus 3 and the I2C bus 4. The I/O control gate array 16 includes several register groups readable/writable by the CPU 11. The register groups are used, and thereby, communications are possible between the CPU 11 and the power controller 17.

A battery pack 18 includes a chargeable secondary battery such as nickel hydrogen battery and lithium ion battery. The battery pack 18 is removably mounted to the computer main body. In addition, the battery pack 18 has a built-in EEPROM. The EEPROM stores battery information showing a kind of secondary battery, residual capacity and low battery detection voltage. The battery information is readable by the power controller 17, and used for battery charge control and system power control.

The power controller 17 controls system power on/off in accordance with the operation of a power switch 20, and supplies operating power to each unit included in the system using the battery pack 18 or AC adapter 19. The power controller 17 has a built-in microcomputer for charge/discharge control to keep the operating state in power-off of the system. In addition, the power controller 17 has both functions of AC adapter removal detection and power supply control.

The battery LED 21 indicates whether or not the battery pack 18 is currently being charged. More specifically, the battery LED 21 turns on green light when the battery pack 18 is in a full-charged state, turns on orange-color light when it is in a charging state, and turn off when it is not charged. In this case, the I/O control gate array 16 carries out the control.

Likewise, the AC adapter LED 22 turns on green light when receiving the power supply from the external-connected AC adapter 19, and turns off when receiving no power supply from there.

Figure 3:
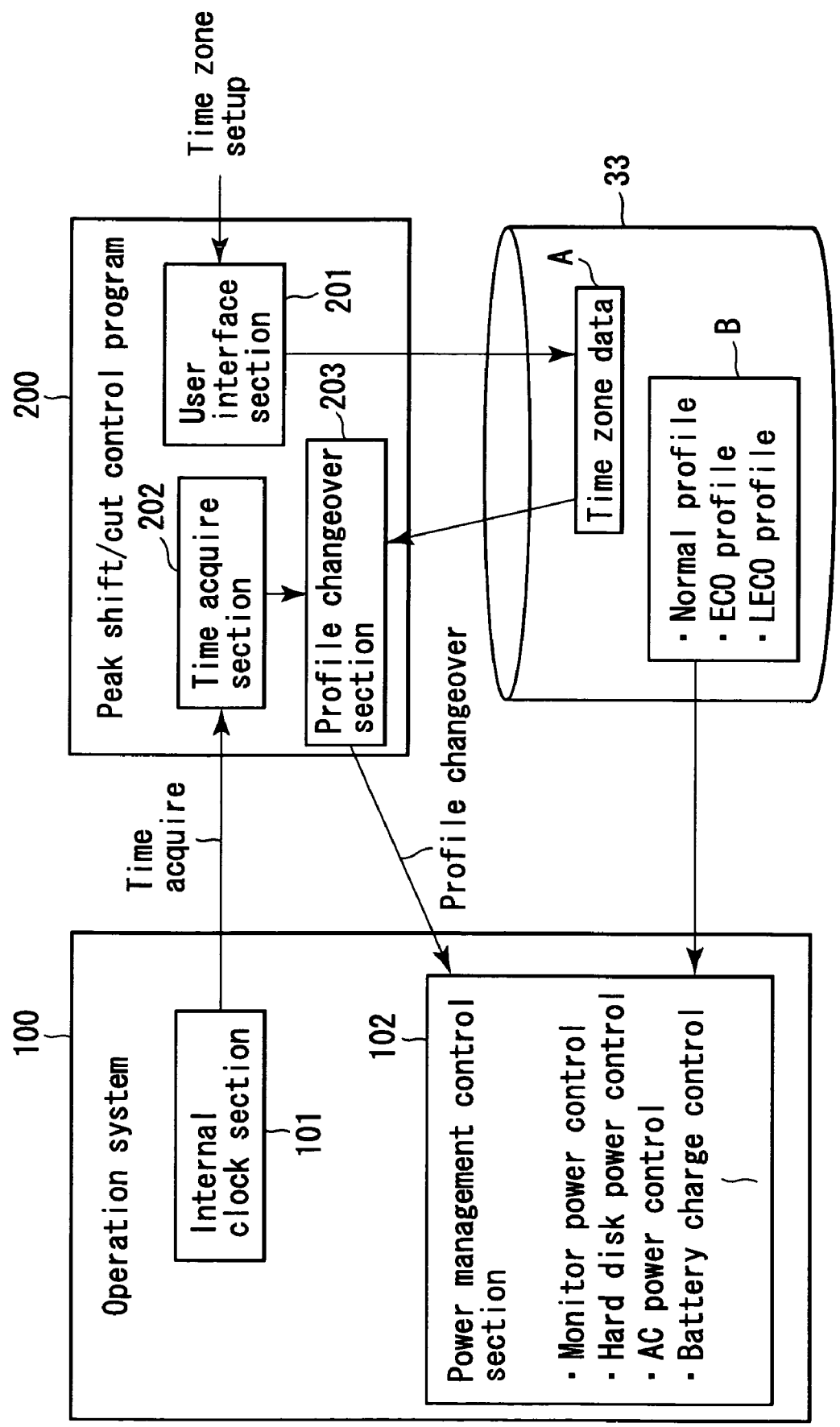
FIG. 3 is a functional block diagram to explain changeover control of system environment setup executed by the electronic apparatus of the embodiment.

FIG. 3 is a functional block diagram to explain the changeover control of system environment setup executed by the electronic apparatus 10.

The electronic apparatus 10 has the following items for setting the system environment. For example, one is an item for turning off the LCD 141 when predetermined time elapses after the operation of the keyboard 321 and the touch pad 322 stops. Another is an item for turning off the HDD when predetermined time elapses after data access stops. In the electronic apparatus 10, the items are collectively managed as a so-called profile. The electronic apparatus 10 holds several profiles, and has mechanism for setting time zone corresponding to the profiles, thereby realizing peak cut and peak shift. The features will be described below in detail.

In the electronic apparatus 10, three profiles, that is, normal profile, ECO profile and LECO (Low ECO) profile are prepared. The normal profile is a profile for setting a system environment for operating the system attaching great importance to performance, that is, for operating it without considering power saving. Also, according to the normal profile, no limitation is given to the use of external power source via the AC adapter 19. On the other hand, ECO and LECO profiles are profiles for setting a system environment for operating the system to give priority to power saving rather than system performance. The power saving conditions are stricter determined in the LECO profile as compared with the ECO profile. The use of external power source via the AC adapter 19 is restricted according to the profiles. Namely, the ECO profile inhibits only charge of the battery pack 18. On the contrary, the LECO profile inhibits both the power supply from the AC adapter 19 and the charge of the battery pack 18.

A peak shift/cut control program 200 operating under the control of an operating system 100 carries out the suitable use of three profiles for each time zone, that is, system environment setting changeover control. The peak shift/cut control program 200 is recorded and distributed to an optical disk, which is readable by the CD-ROM 34. The program 200 is installed in the HDD 33 via the CD-ROM 34, and thereafter, loaded to the main memory 13 and started by the CPU 11. The peak shift/cut control program 200 has user interface section 201, time acquire section 202 and profile changeover section 203.

The user interface section 201 enables the user to set time zone carrying out each profile. The user interface section 201 suggests the setup screen to the user via the LCD 141, and inputs contents set by the user on the screen from the keyboard 321 and the touch pad 322. In addition, the user interface section 201 stores the set time zone in the HDD (time zone data A).

The time require section 202 requires system time counted by an internal clock section 101 of the operating system 100 using the RTC 35, and transfers the acquired system time to the profile changeover section 203.

The profile changeover section 203 compares the system time received from the time acquire section 202 with the time zone data stored in the HDD 33 by the user interface section 201. As the need arises, the profile changeover section 203 gives profile changeover instructions to a power management control section 102 of the operating system 100. The power management control section 102 sets system environment using the profile instructed by the profile changeover section 203 to carry out the following controls. The controls include monitor power control, hard disk power control, AC power supply control and battery charge control.

Now, the electronic apparatus 10 has operating state and environment shown in FIG. 4. More specifically, time 9:00 to 17:00 is operating time zone, and time 12:00 to 16:00 is power consumption concentrated time zone (peak time zone). In the peak time zone, time 13:00 to 15:00 is the most power consumption concentrated time zone.

Figure 5:
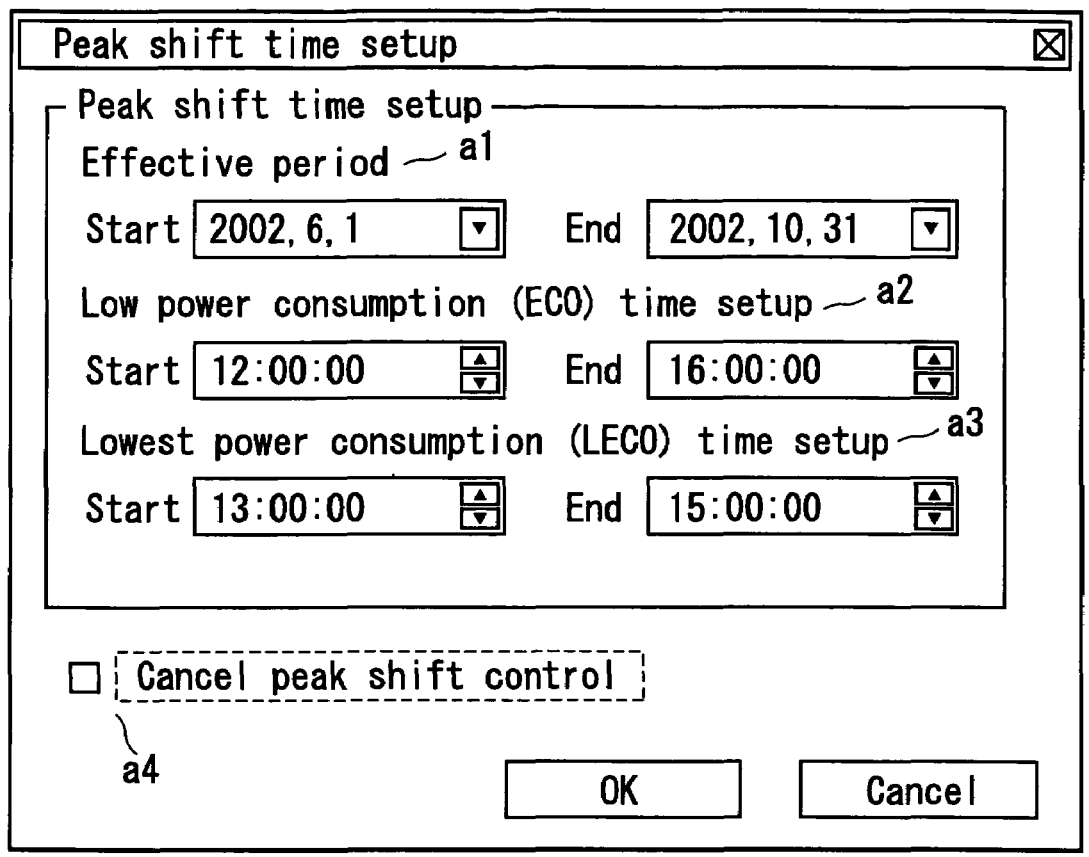
FIG. 5 is a view showing a peak shift time setup screen displayed on the electronic apparatus of the embodiment.

In such a case, the following setting is made in the electronic apparatus 10. The normal profile is basically used while the ECO profile is used in time zones 12:00 to 13:00 and 15:00 to 16:00 and the LEOC profile is used in time zone 13:00 to 15:00. As described above, if profile application time overlaps, the profile having higher power saving function is applied. The profile priority is changeable by the user. In the initial setting, the profile higher power saving function is preset, and the electronic apparatus 10 is controlled based on the profile according to the order of LECO>ECO>normal. FIG. 5 is a view showing a peak shift time setup screen on the LCD 141 displayed by the user interface section.

As shown in FIG. 5, the peak shift time setup screen is provided with the following areas (a1) to (a4). The area (a1) is used to set the setting effective period, and the area (a2) is used to set time zone using the ECO profile. The area (a3) is used to set time zone using the LECO profile, and the area (a4) is used to stop the changeover from normal profile to ECO or LECO profile. When contents shown in FIG. 5 are set on the peak shift time setup screen, the following profile setting is made during the period from Jun. 1, 2002 to Oct. 31, 2002. Namely, the ECO profile is used in time zones 12:00 to 13:00 and 15:00 to 16:00, the LECO profile is used in time zone 13:00 to 15:00, and the normal profile is used in other time zones, that is, 16:00 to the next 12:00.

The above-mentioned setting is made, and thereby, it is possible to realize peak shift suitable to the operating state and environment of the electronic apparatus 10. The principle will be described below with reference to FIG. 6.

When time 12:00 comes, a changeover from the normal profile to the ECO profile is made. In the ECO profile, the charge of the battery pack 18 is inhibited. However, no limitation is give to the use of the external power source via the AC adapter excepting the use of the battery pack 18. Thus, the power consumption by the external power source is reduced by the amount of charging the battery pack 18. In this case, when the charge of the battery pack is inhibited, the I/O control gate array 16 turns off the battery LED 21 to visually give information that charge is stopped, to the user. Thereafter, when time 13:00 comes, a changeover from the ECO profile to the LECO profile is made. In the LECO profile, the use of the external power source via the AC adapter 19 is entirely inhibited; for this reason, the power supply from the external power source becomes zero. During the period from the time 13:00, the electronic apparatus 10 continues to operate by power from the battery pack 18. In the changeover to the LECO profile, the I/O control gate array 16 turns off the AC adapter LED 22 because the power supply from the AC adapter 19 is inhibited. By doing so, the I/O control gate array 16 visually gives information that the power supply from the AC adapter 19 is stopped, to the user.

The state described above is continued by time 15:00, and when time 15:00 comes, a changeover from the LECO profile to the ECO profile is made. Thus, the use of the external power source via the AC adapter 19 is permitted; as a result, the power consumption by the external power source is recovered to the approximately same value as the use of the normal profile. However, the charge of the battery pack 18 is still inhibited; for this reason, the battery pack 18 is left even if it is in a low battery state. In this case, the I/O control gate array 16 turns on the AC adapter LED 22 to visually give information that the power supply from the AC adapter 19 is restarted, to the user.

When time 16:00 comes, a changeover from the ECO profile to the normal profile is made. The charge of the battery pack 18 is permitted; therefore, power consumption by the external power source increases to charge the battery pack 18. In this case, the 16 turns on the battery LED 21 to visually give information that the charge of the battery is restarted, to the user. In this case, the system is operated according to the LECO profile until time 16:00; therefore, the capacity of the battery pack 18 decreases. Thus, the battery LED 21 turns on orange color.

Figure 6:
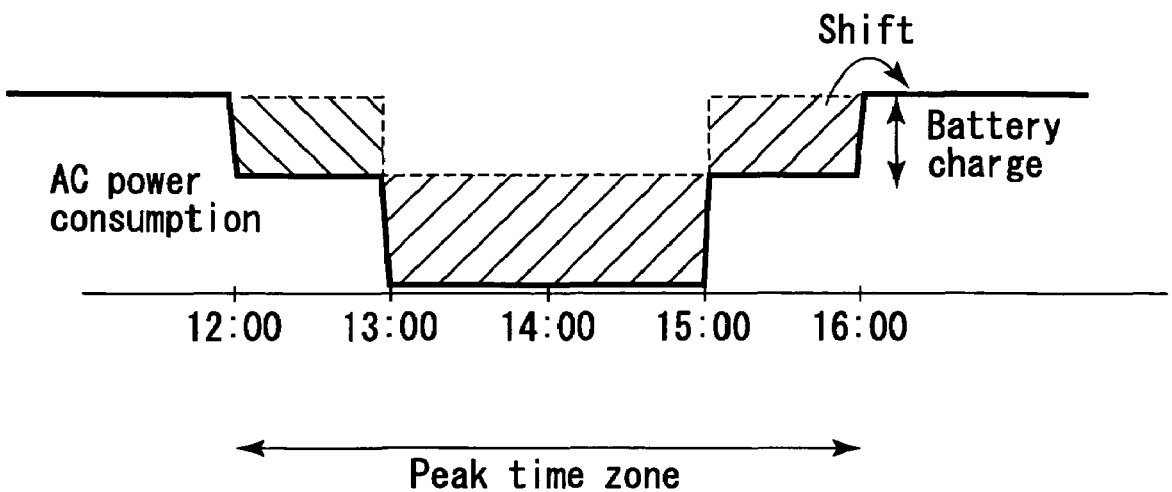
FIG. 6 is a view to explain the principle of realizing peak shift suitable to the electronic apparatus operating state and environment assumed in the embodiment.

The setting described above is carried out, and thereby, the power consumption by the external power source corresponding to slanted portions shown in FIG. 6 is shifted to time after 16:00, that is, peak shift is realized in the electronic apparatus 10.

If the electronic apparatus 10 is operated according to the ECO or LECO profile, when the AC adapter 19 is disconnected, the electronic apparatus 10 is inevitably operated by the power from the battery pack 18. In this case, a changeover from the ECO or LECO profile to the normal profile is made. This is because the concept of the peak shift is given based on the supply of AC power source.

During the ECO or LECO profile application period, if power is turned off or shift to the standby mode is made, the electronic apparatus 10 is shifted to the normal profile because of being released from the operation control according to the ECO or LECO profile. By doing so, the power of the electronic apparatus 10 is turned off while the charge of the battery pack 18 is restarted. Of course, charge can be inhibited according to profile setting even if power is turning off.

For example, the relationship of normal profile>ECO profile>LECO profile is set in the following periods. One is a no-operation period of the keyboard 321 and the touch pad 322 set as the condition of turning off the LCD 141. Another is a no-access period set as the condition of turning off the HDD 33. By doing so, peak cut is also realized while peak shift is made.

Figures 7, 9:
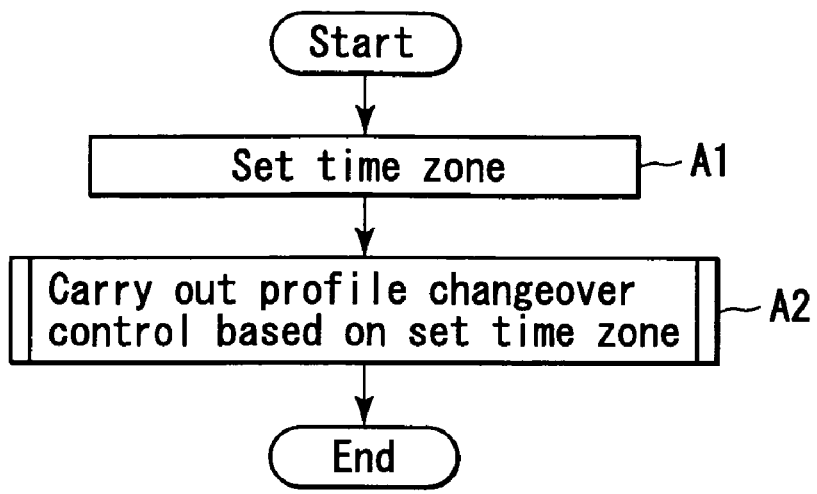
FIG. 7 is a first flowchart to explain a changeover control of the system environment setup in the electronic apparatus of the embodiment.
FIG. 9 is a view showing a profile setup screen displayed on the electronic apparatus of the embodiment.
Figure 8:
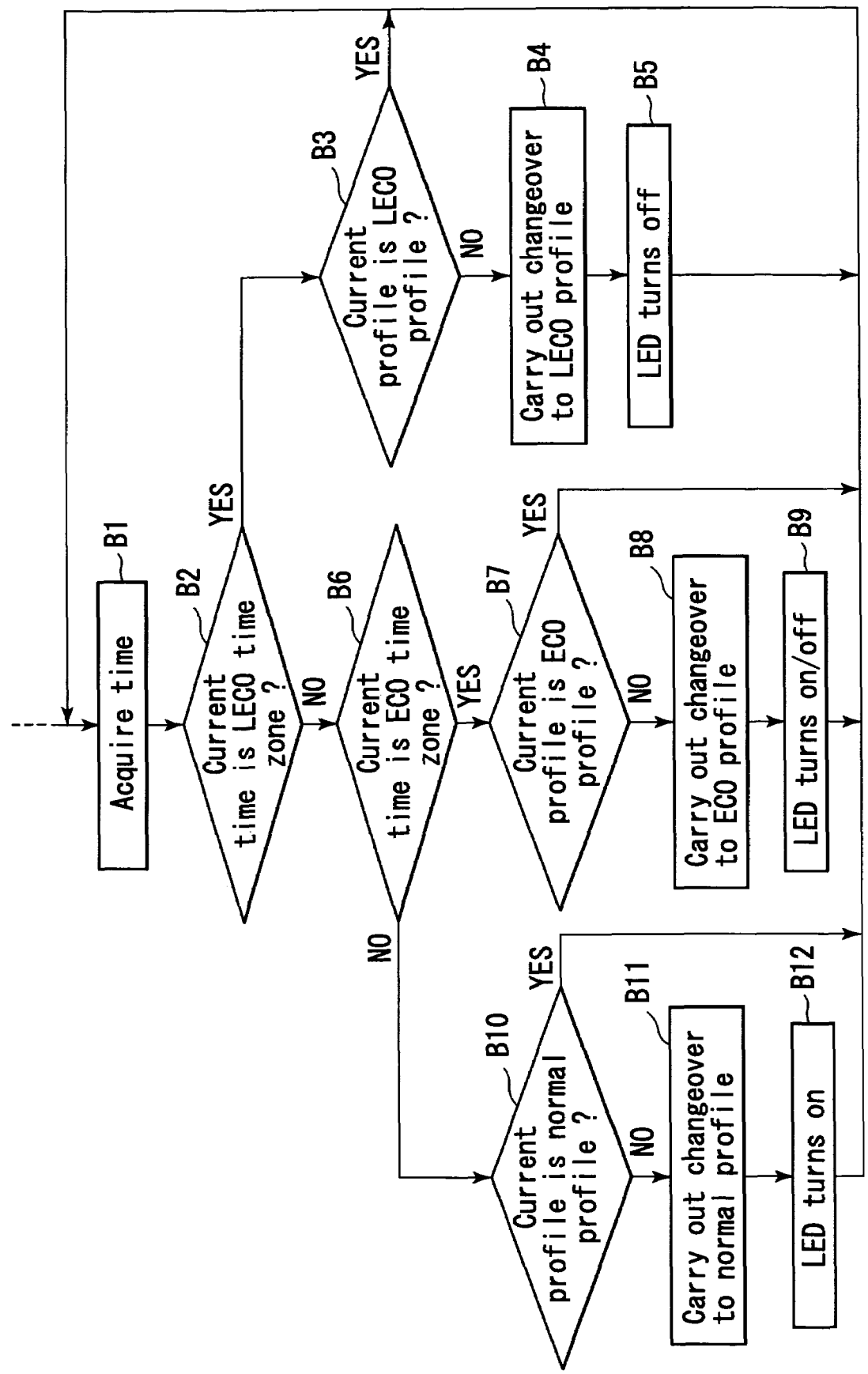
FIG. 8 is a second flowchart to explain the changeover control of the system environment setup in the electronic apparatus of the embodiment.

FIG. 7 and FIG. 8 are flowcharts to explain the system environment setting changeover control in the electronic apparatus 10.

According to the system environment setting changeover control by the peak shift/cut control program 200, the user interface section 201 sets time zone corresponding to each profile (step A1 in FIG. 7). The profile changeover section 203 controls the profile changeover based on the set time zone while receiving system time from the time acquire section 202 (step A2 in FIG. 7). FIG. 8 is a flowchart showing the profile changeover control in detail.

The time acquire section 202 periodically acquires system time from the internal clock section 101 of the operating system 100, and transfers the system time to the profile changeover section 203 (step B1 in FIG. 8). The profile changeover section 203 receiving the system time determines whether the current time belongs to which time zone set by the user interface section 201. Thereafter, the profile changeover section 203 carries out the profile changeover based on the result. More specifically, the profile changeover section 203 determines whether or not the current time is time zone using the LECO profile (step B2 in FIG. 8). If so (YES of step B3 in FIG. 8), the profile changeover section 203 determines whether or not the currently using profile is the LECO profile (step B3 in FIG. 8). If not so (NO of step B3 in FIG. 8), the profile changeover section 203 gives instructions for the changeover to the LECO profile to the power management control section 102 of the operating system 100 (step B4 in FIG. 8). When the changeover to the LECO profile is made, the battery LED 21 and the AC adapter LED 22 are turned off (step B5 in FIG. 8). By doing so, the user can be visually seen that the charge of the battery pack 18 and the power supply from the AC adapter are both stopped.

On the other hand, if the current time is not the time zone using the LECO profile (NO of step B2 in FIG. 8), the profile changeover section 203 determines whether or not the current time is time zone using the ECO profile (step B6 in FIG. 8). If the current time is the time zone using the ECO profile (YES of step B6 in FIG. 8), the profile changeover section 203 determines whether or not the currently using profile is the ECO profile (step B7 in FIG. 8). If not so (NO of step B7 in FIG. 8), the profile changeover section 203 gives instructions for the changeover to the ECO profile to the power management control section 102 of the operating system 100 (step B8 in FIG. 8). When the changeover to the ECO profile is made, the battery LED 21 is turned off while the AC adapter LED 22 is turned on (step B9 in FIG. 8). By doing so, the user can be visually seen that the charge of the battery pack 18 is stopped while the power from the AC adapter is supplied.

If the current time is not the time zone using the ECO profile, that is, if it is time zone using the normal profile (NO of step B6 in FIG. 8), the profile changeover section 203 determines whether or not the currently using profile is the normal profile (step B10 in FIG. 8). If not so (NO of step B10 in FIG. 8), the profile changeover section 203 gives instructions for the changeover to the normal profile to the power management control section 102 of the operating system 100 (step B11 in FIG. 8). When the changeover to the normal profile is made, the battery LED 21 and the AC adapter LED 22 are both turned on (step B12 in FIG. 8). By doing so, the user can be visually seen that the charge of the battery pack 18 and the power supply from the AC adapter are both started.

In the embodiment, the time acquire section 202 periodically acquires the system time from the internal clock section 101 of the operating system 100. The profile changeover section 203 may refer to time zone data A stored in the HDD 33 by the user interface section 201 to find profile changeover time. Thereafter, the profile changeover section 203 may give the time to the time acquire section 202. In this case, the time acquire section 202 makes a request to return information when the profile changeover time comes with respect to the internal clock section 101 of the operating system. If the information is returned, the time acquire section 202 gives the time arrival information to the profile changeover section 203.

As described above, the peak shift/cut control program 200 carries out the system environment setting changeover control. By doing so, the electronic apparatus 10 can properly use several profiles in accordance with time zone, so that the system environment setting changeover can be automatically carried out.

Figures 10, 11:
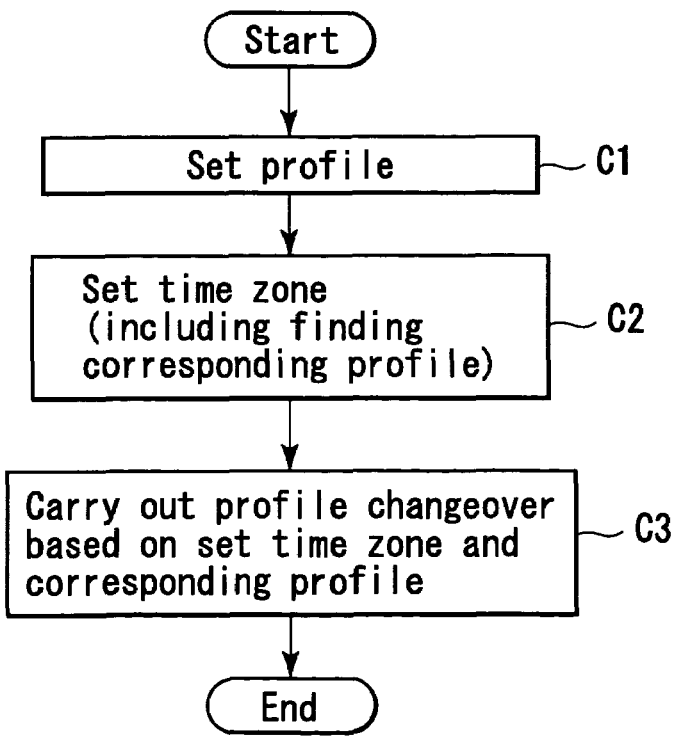
FIG. 10 is a view showing a time zone setup screen displayed on the electronic apparatus of the embodiment.
FIG. 11 is a third flowchart to explain the changeover control of the system environment setup in the electronic apparatus of the embodiment.

The above is the description on the example that arbitrary time zone is made correspondent to profiles prepared on the system side. In this case, the user may set system environment setting items collectively managed by the profiles. FIG. 9 is a view showing a profile setup screen on the LCD 141 displayed via the user interface section 201. FIG. 10 is a view showing a time zone setup screen on the display 141 displayed via the user interface section 201.

As illustrated in FIG. 9, the profile setup screen is provided with areas (b1) to (b5). The area (b1) is used to set a profile name, and the area (b2) is used to set whether or not the charge of the battery pack 18 is inhibited. The area (b3) is used to set whether or not the use of the external power source via the AC adapter 19 is inhibited. The area (b4) is used to set whether or not automatic off of the LCD 141 is made and its operating conditions. The area (b5) is used to set whether or not automatic off of the HDD 33 is made and its operating conditions. The user interface section 201 stores contents set on the profile setup screen in the HDD 33 (profile B).

As seen from FIG. 10, the time zone setup screen is provided with areas (c1) and several sets of combinations of areas (c2) and (c3). The area (c1) is used to set the normal profile located as the initial setup value. The area (c2) is used to set time zone, and the area (c3) is used to set a profile used in the time zone thus set. The user interface section 201 stores time zone set on the time zone setup screen and the profile corresponding to the time zone in the HDD 33 (time zone data A).

The user interface section 201 sets time zone data A and profile B, and thereafter, the time acquire section 202 acquires system time. The profile changeover section 203 carries out profile changeover control based on the acquired system time.

FIG. 11 is a flowchart to explain the foregoing system environment setting changeover control.

The user interface section 201 of the peak shift/cut control program 200 sets profile (step C1 in FIG. 11), time zone and profile corresponding to the time zone (step C2 in FIG. 11). The profile changeover section 203 carries out profile changeover control based on the set time zone and the corresponding profile while receiving the system time from the time acquire section 202 (step C3 in FIG. 11).

As described above, the user sets the profile, and thereby, it is possible to realize peak shift and peak cut having high flexibility in accordance with use's condition and circumstances. In addition, mechanism for setting the profile is provided, and thereby, the following effect is obtained. Namely, the profile is properly changed, and thereby, the system environment setting can be automatically changed in accordance with time zone, in addition to power saving control such as peak shift and peak cut.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus powered by an external power source or a battery chargeable by the external power source, the apparatus comprising:
   a storage unit storing profiles for managing system operating environment items;
   a setting unit configured to set a time zone capable of executing the system operation in accordance with the profiles;
   a control unit configured to carry out system operation based on the profile corresponding to the time zone set by the setting unit; and
   an indicator unit configured to show a power supply state of the external power source,
   wherein the indicator unit shows that a power supply from the external power source is stopped when the electronic apparatus is driven by the battery based on the first profile.

2. An electronic apparatus powered by an external power source or a battery chargeable by the external power source, the apparatus comprising:
   a storage unit storing profiles for managing system operating environment items;

a setting unit configured to set a time zone capable of executing the system operation in accordance with the profiles; and a control unit configured to carry out system operation based on the profile corresponding to the time zone set by the setting unit, wherein, a first profile of the profiles includes a setup item for driving the electronic apparatus by the external power source in a first time zone set by the setting unit, and inhibiting the charge of the battery, and the control unit drives the electronic apparatus by the external power source in the first time zone set based on the first profile, and stops the charge of the battery.

3. The apparatus according to claim 2, further comprising:

an indicator unit configured to show whether or not the battery is in a charged state, the indicator unit shows that the charge of the battery is stopped when the charge of the battery is stopped based on the first profile.

4. An electronic apparatus powered by an external power source or a battery chargeable by the external power source, the apparatus comprising:

a storage unit storing profiles for managing system operating environment items;

a setting unit configured to set a time zone capable of executing the system operation in accordance with the profiles; and a control unit configured to carry out system operation based on the profile corresponding to the time zone set by the setting unit, wherein, a first profile of the profiles includes a setup item for driving the electronic apparatus to give priority to the use of the battery rather than the use of the external power source in a first time zone set by the setting unit, and the control unit drives the electronic apparatus by the battery in the first time zone set based on the first profile, and drives it by the external power source when a residual capacity of the battery becomes less than a predetermined residual capacity.

5. The apparatus according to claim 4, wherein a second profile of the profiles includes a setup item for stopping the charge of the battery in a second time zone set by the setting unit, and the control unit stops the charge of the battery source in the second time zone set based on the second profile.

6. The apparatus according to claim 5, further comprising:

an indicator unit configured to show whether or not the battery is in a charged state, the indicator unit shows that the charge of the battery is stopped when the charge of the battery is stopped based on the second profile.

7. An electronic apparatus powered by an external power source or a battery chargeable by the external power source, the apparatus comprising:

a first setting unit configured to set a system operating environment;

a storage unit storing several profiles of managing contents of setup items set by the first setting unit;

a second setting unit configured to set several time zones;

a third setting unit configured to select an arbitrarily corresponding profile from the several profiles in accordance with each time zone set by the second setting unit;

a control unit configured to control a system operation based on a system environment setting changeover profile associated by the third setting unit in accordance with a time zone set by the second setting unit; and an indicator unit configured to show a power supply state of the external power source, wherein, a first profile of the profiles includes a setup item for driving the electronic apparatus by the battery in a first time zone set by the second setting unit;

the control unit drives the electronic apparatus by the battery in the first time zone set based on the first profile; and the indicator unit shows that a power supply from the external power source is stopped when the electronic apparatus is driven by the battery based on the first profile.

8. An electronic apparatus powered by an external power source or a battery chargeable by the external power source, the apparatus comprising:

a first setting unit configured to set a system operating environment;

a storage unit storing several profiles of managing contents of setup items set by the first setting unit;

a second setting unit configured to set several time zones;

a third setting unit configured to select an arbitrarily corresponding profile from the several profiles in accordance with each time zone set by the second setting unit; and a control unit configured to control a system operation based on a system environment setting changeover profile associated by the third setting unit in accordance with a time zone set by the second setting unit, wherein, a first profile of the profiles includes a setup item for driving the electronic apparatus to give priority to the use of the battery rather than the use of the external power source in a first time zone set by the second setting unit, and the control unit drives the electronic apparatus by the battery in the first time zone set based on the first profile, and drives it by the external power source when a residual capacity of the battery becomes less than a predetermined residual capacity.

9. The apparatus according to claim 8, wherein a second profile of the profiles includes a setup item for stopping the charge of the battery in the second time zone set by the second setting unit, and the control unit stops the charge of the battery source in the second time zone set based on the second profile.

10. The apparatus according to claim 9, further comprising:

an indicator unit configured to show whether or not the battery is in a charged state, the indicator unit shows that the charge of the battery is stopped when the charge of the battery is stopped based on the second profile.

* * * * *